(12) United States Patent
Batten et al.

(10) Patent No.: US 8,273,255 B2
(45) Date of Patent: Sep. 25, 2012

(54) ECONOMICAL FAT, OIL, AND GREASE WASTE REMOVAL SYSTEM AND METHOD

(75) Inventors: William C. Batten, Asheboro, NC (US); Bruce W. Kyles, Asheboro, NC (US); Randolph H. Batten, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 321 days.

(21) Appl. No.: 12/793,913

(22) Filed: Jun. 4, 2010

(65) Prior Publication Data

US 2011/0297626 A1 Dec. 8, 2011

(51) Int. Cl.
*B01D 17/025* (2006.01)

(52) U.S. Cl. .......... 210/800; 210/95; 210/236; 210/241; 210/257.1; 210/519; 210/540

(58) Field of Classification Search .................. 210/776, 210/800, 801, 95, 236, 238, 241, 257.1, 519, 210/521, 538, 540
See application file for complete search history.

(56) References Cited

U.S. PATENT DOCUMENTS

| | | | | |
|---|---|---|---|---|
| 1,164,527 A | * | 12/1915 | Kelly | 210/540 |
| 4,422,931 A | * | 12/1983 | Wolde-Michael | 210/540 |
| 5,705,055 A | * | 1/1998 | Holloway et al. | 210/540 |
| 5,971,163 A | | 10/1999 | Gurfinkel | |
| 5,993,646 A | * | 11/1999 | Powers | 210/95 |
| 6,517,715 B1 | * | 2/2003 | Batten et al. | 210/538 |
| 6,800,195 B1 | | 10/2004 | Batten et al. | 210/138 |
| 6,849,176 B1 | | 2/2005 | Batten et al. | 210/97 |
| 7,153,439 B1 | | 12/2006 | Batten et al. | 210/800 |
| 7,186,346 B1 | | 3/2007 | Batten et al. | 210/776 |
| 7,208,080 B2 | | 4/2007 | Batten et al. | 210/86 |
| 7,431,852 B2 | | 10/2008 | Batten et al. | 210/801 |
| 7,481,321 B2 | * | 1/2009 | Ismert | 210/519 |
| 2001/0027954 A1 | | 10/2001 | Broeders et al. | |
| 2003/0042213 A1 | | 3/2003 | Hard | |
| 2007/0251879 A1 | | 11/2007 | Batten et al. | |
| 2008/0061012 A1 | | 3/2008 | Hodgekins et al. | |
| 2008/0179262 A1 | | 7/2008 | Batten et al. | |

FOREIGN PATENT DOCUMENTS

JP 2009/262066 11/2009

* cited by examiner

*Primary Examiner* — Christopher Upton (57) ABSTRACT

An economical fat, oil and grease removal assembly and method includes a container having a bottom, a top, a sidewall, an inlet and an outlet. The outlet is spaced above the bottom and below the top to define a static water level for liquid in the container. The container includes at least one baffle extending downwardly to a level below the static water level. The container further includes a port at an elevation such that F.O.G. floating on water in the container can flow from the container out through the port when the liquid level in the container is raised above the static water level. The assembly further includes an inlet bridge, an outlet bridge and a storage tank arranged to accept F.O.G. that is flowed out of the container. A hub on the storage tank interfaces the container with the storage tank.

32 Claims, 12 Drawing Sheets

ECONOMICAL FAT, OIL, AND GREASE WASTE REMOVAL SYSTEM AND METHOD

FIELD OF THE INVENTION

The present invention relates generally to a low cost assembly and method for removal, storage and disposal of fats, oil, grease waste and, more particularly, to a system for separation of fat, oil, and/or grease from an effluent flow from a sink, permitting the passage of grey water to a sewage line.

BACKGROUND

Over the past thirty years there has been a move towards requiring food-handling facilities to have sufficient systems for servicing kitchen grease and solid waste bearing water flows. One of the largest problems, in terms of sewer system lines clogging, has been the fats, oils and grease put into the sewer system from food handling facilities. These problems and the increase of the severity of the situation in the recent past has led more and more sewer authorities to implement fats, oils, grease (hereinafter referred to as "F.O.G.") control programs. The object of many of these programs is to ensure that food handling facilities remove as much as possible of the F.O.G. from the effluent flow, thereby releasing only grey water and solids into the sewage system.

F.O.G. removal systems are well known. There has been a movement toward accomplishing such removal in kitchen facilities through use of a container including one or more rotating disks formed of a plastic or like material to which oil and grease contaminants are attracted. Typically, the rotation of the disk in at least partially immersed condition allows the oil to cling to the disk, so that the oil and grease is removed from the body of the water upon rotation of the disk. A scraper is typically used to force the oil and grease contaminants from the opposite sides of the disk and channel such contaminants into an attached storage collection unit.

The above-mentioned types of devices are assembled within rigid containers and the rotating disks are in fixed positions. The scraper assemblies are also in fixed rigid positions. This may make servicing of the apparatus difficult, particularly since the parts to be serviced have been covered in grease and oil. In addition, the units may have been permanently installed in a plumbing system so field service is often required. Because of the nature of installation, the field service can be difficult. Because may of the parts are coated with F.O.G., servicing can be messy and time consuming. These systems tend to be expensive and represent a significant capital investment.

As an alternative, devices without scraper assemblies have been developed so that separation of F.O.G. and water occurs within a tank sufficient to also suffice as a storage container. These devices avoid many of the difficulties associated with the skimmer system; however, they are still expensive, difficult and messy, particularly when the storage container is full and must be emptied. These units are often too large in size to fit inside kitchen facilities so a space to accommodate the assembly size must be available for the larger separator to work. Many of these types of systems may still utilize more costly pumping apparatus for F.O.G. separation or sensing systems for accurately becoming aware of when the storage container is full. Knowing when to empty the storage container is a problem since it is often unclear how much water versus how much F.O.G. is being retained within the storage container.

The process of emptying a removable storage container is known to be very messy. If the tank and storage container are attached so that leakage does not occur when the F.O.G. is passed to a storage container, then removing the storage container for disposal is often complicated and dirty. This is undesirable as it limits who can empty the storage container and often is occurring in a facility, such as a restaurant, held to certain cleanliness standards. Size, cost, ease of use and mess are all factors that may limit consumers access to F.O.G. separation assemblies.

Accordingly, there is a need in the art for a new method and system for separation of F.O.G. from wastewater that is simple, space saving in design, low in cost and that minimizes the mess/difficulty associated with the storage container. In addition, there is a need in the art for a low cost apparatus that does not require significant capital outlay.

SUMMARY OF THE INVENTION

The present invention fulfills one or more of these needs in the art by providing an economical F.O.G. removal assembly which is low in cost, conservative in size, easy to install, easy to maintain, and minimizes the mess associated with discarding accumulated and stored F.O.G.

Accordingly, one aspect of the present invention is to provide a F.O.G. removal assembly including a container having a bottom, a top, a sidewall, and an inlet to receive an influent flow of F.O.G. and water from a sink drain. The container also includes an outlet for discharging grey water from the container that is spaced above the bottom and below the top. The container may include at least one baffle extending downwardly to a level below the static water level to allow water to flow below the baffle from the inlet to the outlet but retaining F.O.G. floating on the water. The container includes a port at an elevation such that F.O.G. floating on water in the container can flow from the container out through the port when the liquid level in the container is raised above the static water level. The assembly may also include an inlet bridge, an outlet bridge and a storage tank. The inlet bridge directs the influent from the sink drain into the inlet, and an outlet bridge directs the grey water out of the container and defines a static water level in the container. A storage tank is arranged to accept F.O.G. that flows out of the container through the port when the liquid level in the container is raised above the static water level. The storage tank includes a hub that interfaces with the port through a guide funnel having a seal.

The present invention may also be considered a method of removing F.O.G. from effluent including connecting a kitchen drain to an inlet of a container, connecting a sewage drain to an outlet in the container, the outlet being at a height such that a static water level for liquid in the container is defined, interfacing a hub on a storage tank with a port on the container, discharging effluent water containing F.O.G. from the kitchen drain into the inlet, holding the effluent water containing F.O.G inside the container for a period to allow F.O.G. to float to the top of the contained effluent water, permitting grey water to flow from the container outlet to the sewage drain, intermittently raising the liquid level in the container above the static water level, and while the liquid level is raised, discharging floating F.O.G. through the port in the container and into the storage tank, monitoring a sight glass on the storage tank to determine when the F.O.G. level within the tank is sufficient to warrant emptying, separating the interface between the hub and the port by replaceably removing the storage tank, emptying the F.O.G. stored in the storage tank, and reestablishing the interface between the hub and the port.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

It will be understood that the illustrations are for the purpose of describing a pre-ferred embodiment of the invention and are not intended to limit the invention thereto.

Figure 1:
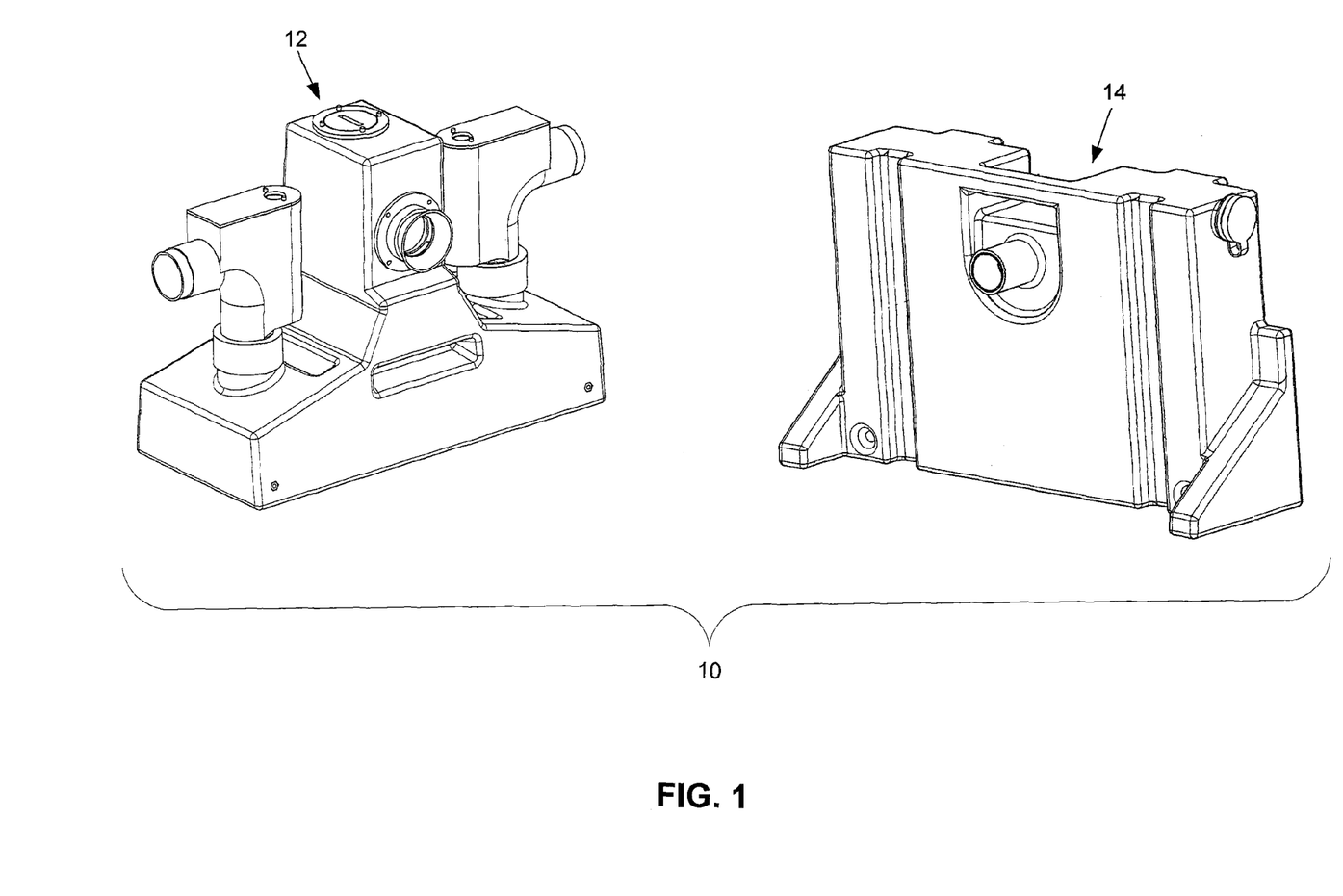
FIG. 1 is a schematic drawing of an embodiment of the invention.

As best seen in FIG. 1, an economical fat, grease and oil (F.O.G.) waste removal assembly, generally designated 10, is shown constructed according to the present invention. The assembly 10 separates F.O.G. from effluent and is sized to fit inside kitchen or other facilities and provides storage for the separated F.O.G., however it does not need scraper apparatus or sensors in order to function properly. The design makes the F.O.G. removal assembly extremely economical and size conscious, in addition to reducing the mess usually associated with F.O.G. separation and storage units.

Figure 2:
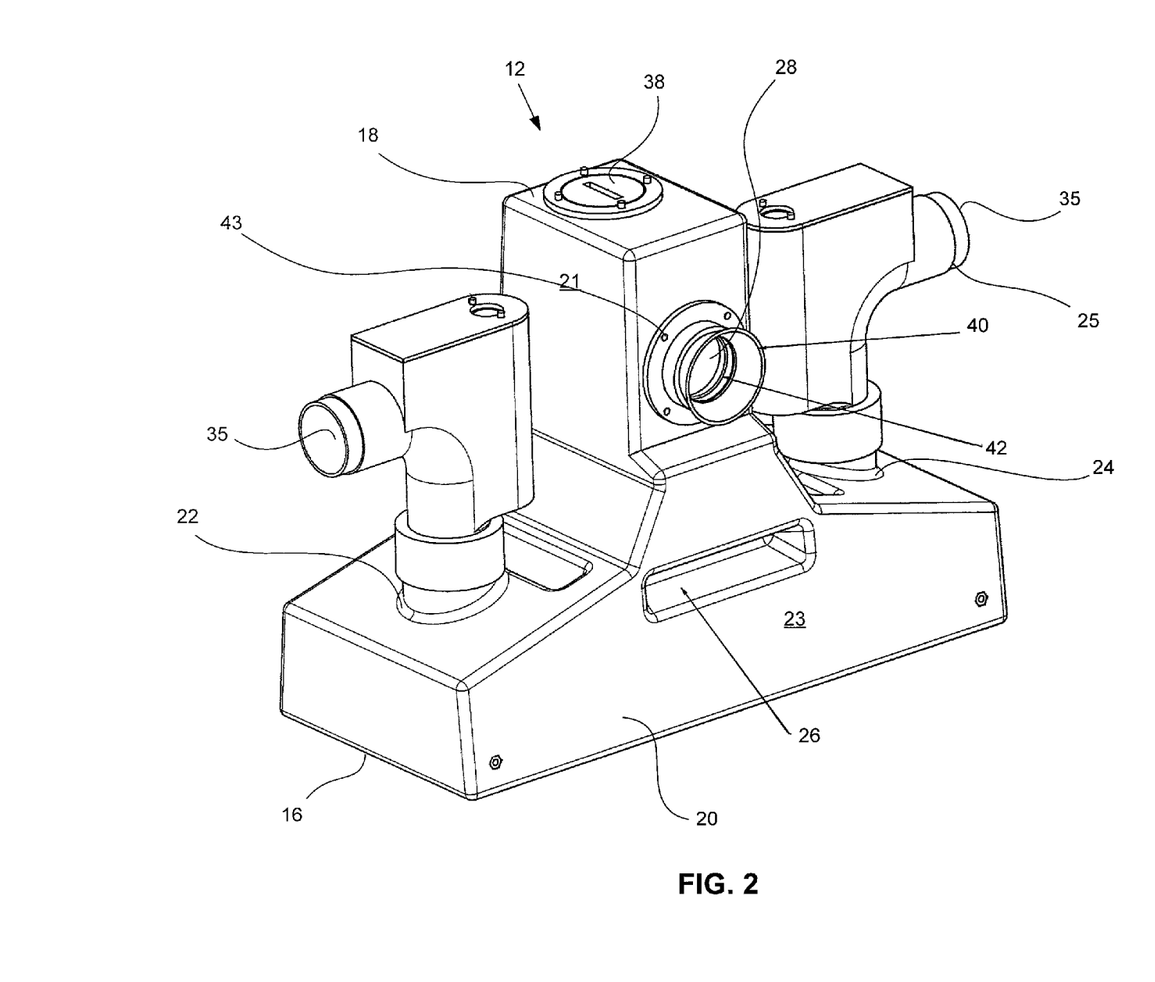
FIG. 2 is a front perspective view of an embodiment of the container.
Figure 3:
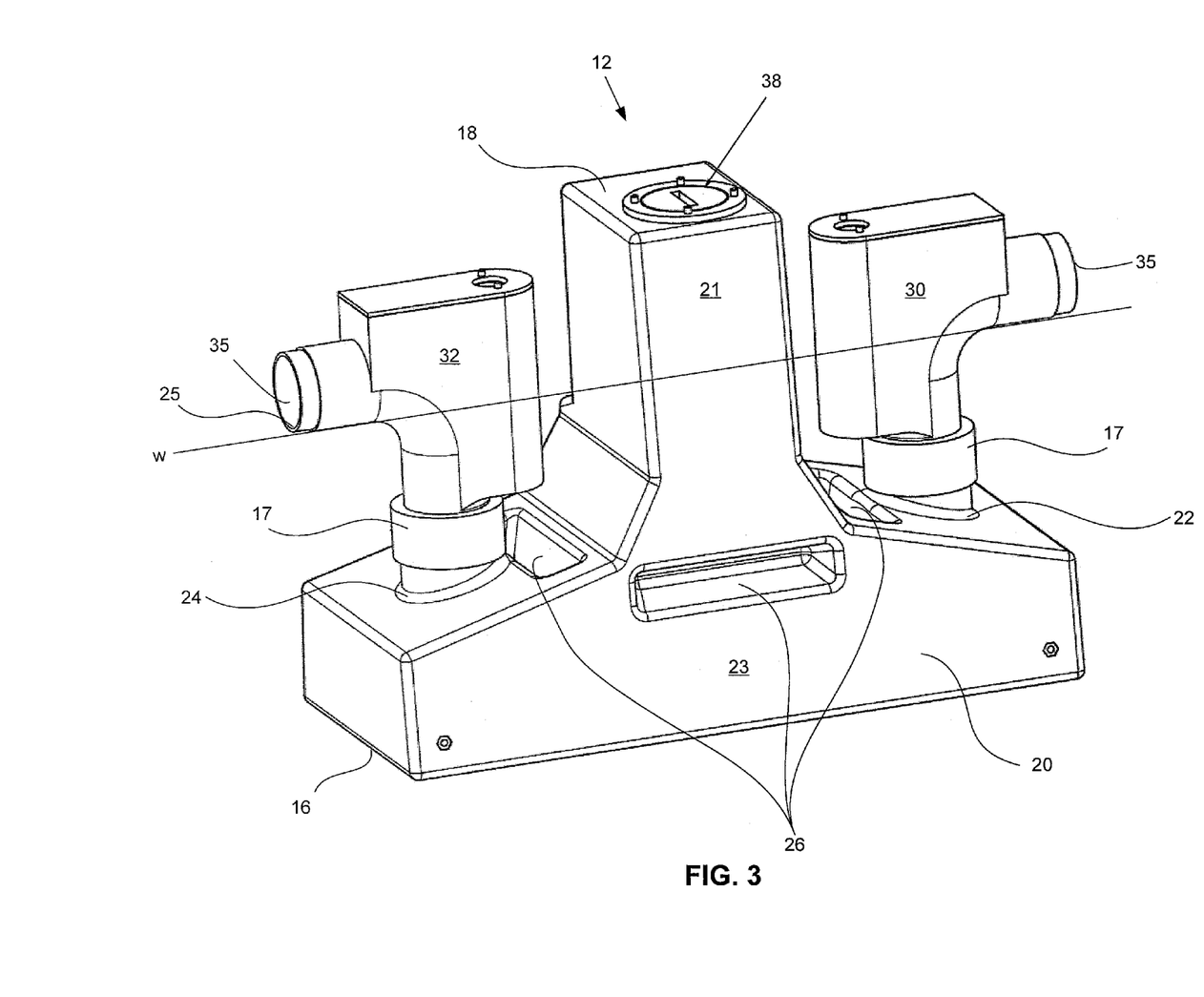
FIG. 3 is a back perspective view of an embodiment of the container.

In FIGS. 1-3, one embodiment of assembly 10 includes a container 12 having a bottom 16, a top 18, a sidewall 20, and an inlet 22 to receive an influent flow of F.O.G. and water from a sink drain. The container also includes an outlet 24, for discharging grey water from the container 12. The container 12 may include at least one baffle 26 extending downwardly to a level below the static water level to allow water to flow below the baffle 26 from the inlet 22 to the outlet 24 but retaining F.O.G. floating on the water in a riser 21. The container also includes a port 28 at an elevation in the riser 21 such that F.O.G. floating on water in the container 12 can flow from the container 12 out through the port 28 when the liquid level in the container is raised above the static water level, such as by a surge of influent coming from a connected upstream sink of wash water.

The assembly 10 may also include an inlet bridge 30, an outlet bridge 32. The inlet bridge 30 directs the influent from the sink drain (not shown) into the inlet 22 and an outlet bridge 32 directs the grey water out of the container 12 via outlet 24 and to a drain pipe (not shown) to a sewer. The outlet bridge 32 is located above the bottom 16 and below the top 18, so that the bottom of the outlet bridge 25 defines a static water level W for liquid in the container 12.

Figure 8:
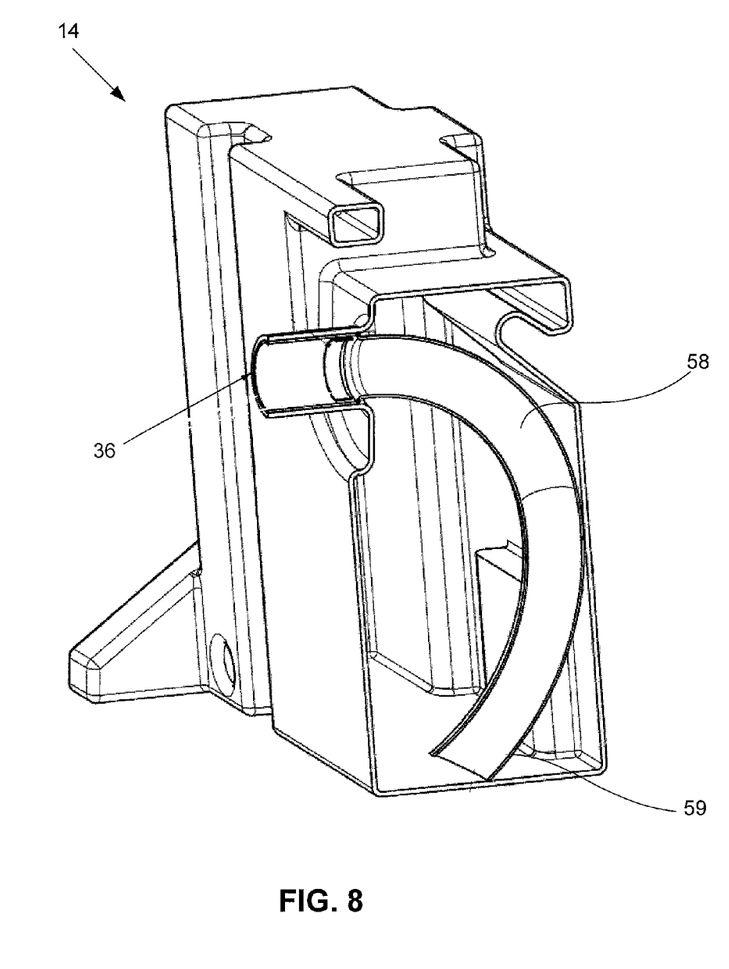
FIG. 8 is a lateral sectional view of an embodiment of the storage tank.

A storage tank 14 is arranged to accept F.O.G. and water that flows out of the container 12 through the port 28 when the liquid level in the container 12 is raised above the static water level. The storage tank 14 includes a hub 36 that interfaces with the port 28. As seen in FIG. 8, the hub 36 has a connected tube 58 that extends to a low point in the tank 14, so that F.O.G. and water that enters tank 14 does so at this low point. From there, F.O.G. rises in the tank 14 unlike water stays below the F.O.G. and near the exit 59 of the tube 58.

Container 12 and tank 14 are preferably constructed of rotomolded plastic, although they may be constructed of other suitable material or methods as well.

Top 18 of container 12 may have a raised height which may permit a significant rise and fall of fluid level with the riser 21 caused by an input volume level greater than the outlet bridge 32 flow volume. The surging flow of fluid aids the F.O.G. within the fluid mixture to rise to the top of the fluid within the container 12. The F.O.G. is lighter than water and rises to the top of the fluid by the force of gravity. However, water levels within the container 12 rise too and can spill over through port 28 into container 14 together with the F.O.G.

The F.O.G. waste removal assembly 10 is typically connected to a kitchen sink (not shown). However, other sources of effluent providing intermittent flows may be connected to assembly 10. The fluid separation process of the invention is applicable to input sources of F.O.G. and water that provide intermittent flows. Together, these sources are referred to herein as "sinks."

Typically, inlet bridge 30 and inlet 22 receive an influent flow of F.O.G. and water from a sink drain. Outlet 24 and outlet bridge 32 are for discharging grey water from the container 10 and outlet bridge 32 is spaced above the bottom 16 and below the top 18 in order to define a static water level W for liquid in the container. Any heavy solids may be allowed to sink to the bottom of container body 23 and tend to be flushed through the container to the outlet.

One or more baffle 26 may extend downwardly to a level below the static water level to allow solids and water to flow below the baffle from the inlet 22 to the outlet 24 but retaining F.O.G. floating on the water. In one embodiment, there may be a set of baffles 26 which may include two, three, four or more baffles, however, four baffles preferably are located near the lower portion of the riser 21 so that water passes below the baffles 26 while accumulated F.O.G. is substantially undisturbed and retained within the riser 21. The riser 21 has a height higher than the static fluid level W within the container 12. This height typically is higher than most of container 12 to concentrate or focus the F.O.G. in riser 21. Riser 21 may also include a clean out port 38 through which solid waste materials may be removed when they settle on the bottom 16 or to otherwise access the interior in case servicing is needed.

Port 28 is placed at an elevation, typically on riser 21, such that F.O.G. floating on the water in container 12 can flow from container 12 out through port 28 when the liquid level in the container is raised above the static water level W. In one embodiment, guide funnel 40 may be included on port 28 and may include a seal 42.

Figure 4:
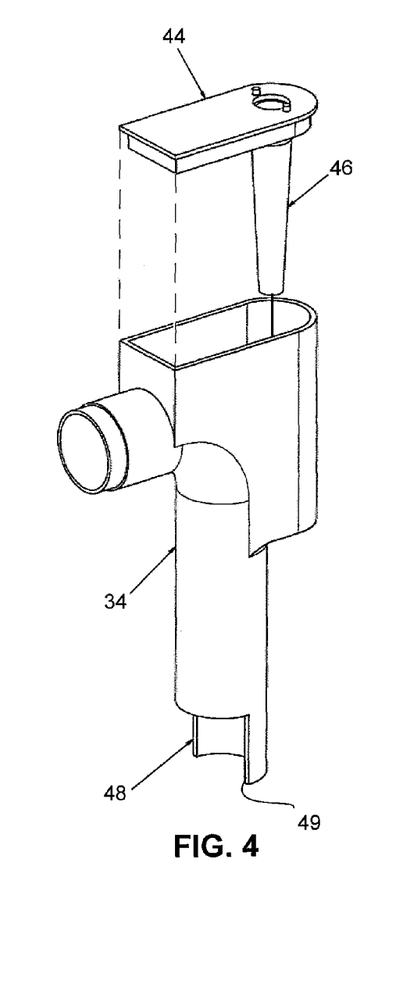
FIG. 4 is an expanded view of an embodiment of an inlet bridge, the outlet bridge being identical.
Figure 5:
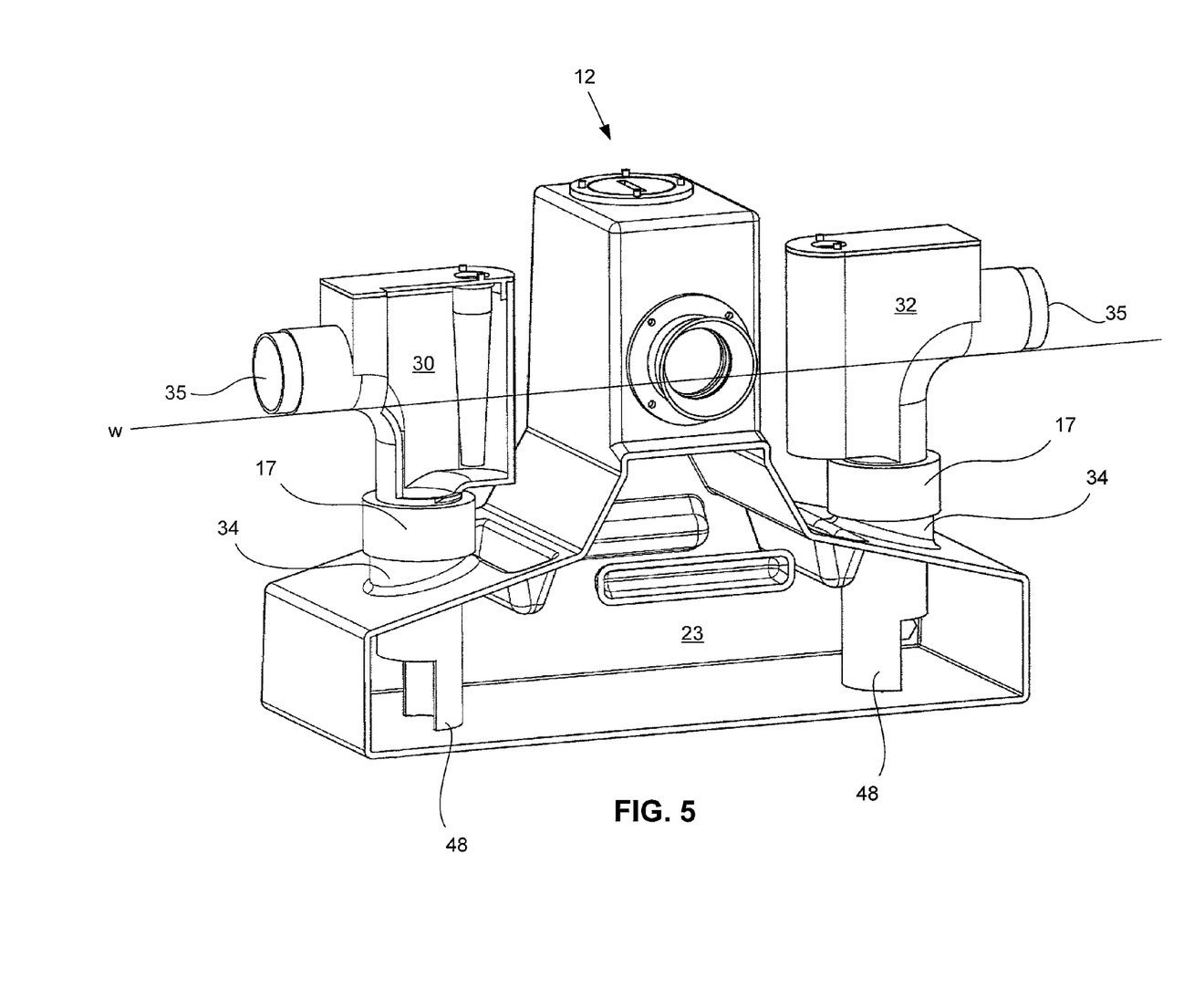
FIG. 5 is a sectional view of an embodiment of the container.

As shown in FIG. 5, inlet bridge 30 and outlet bridge 32 may be interchangeable and are typically constructed the same. The bridges 30, 32 may rotate laterally within their connections 17 to container 10 to accommodate a variety of kitchen drain and sewage line angle configurations. Bridges 30, 32 typically may connect to inlet 22 and outlet 24 via rubber connectors. As seen in FIG. 4, bridges 30, 32 also connect (via piping) with either the sink drain or the sewage drain on their ends 35. Since the inlet and outlet ends of the container 10 and their bridges 30, 32 are mirror images of one another, the container may be installed with either end being the inlet or outlet, simplifying installation in a variety of sink and sewer environments and providing options as to the optimal placement for the storage tank 14.

Bridges 30, 32 may include a lower portion 34 and an upper portion 44. Upper portion 44 may be removable or may be one continuous piece with lower portion 34. Upper portion 44 may include an anti-siphon tube 46 that extends downwardly into lower portion 34. Lower portion 34 may include a counter flow barrier 48 having a notch 49. Counter flow barrier 48 may rest on the bottom 16 of container 12.

Effluent flow from a sink drain enters inlet bridge 30 and flows out of the lower portion 34 through the notch 49. Barrier 48 of inlet bridge 30 directs the effluent flow as it exits the inlet bridge 30 away from the stratification taking place in the riser 21 so that any stratified F.O.G. is minimally disturbed by any strong currents in the incoming effluent flow. The flow dispenses and reverses direction and travels into the body of the container 23, where substantial separation of F.O.G. and grey water occurs. Grey water continues below the baffles 26 while F.O.G. floats to the top and is gathered into riser 21. The grey water flows around the barrier 48 of outlet bridge 32 and exits container 12 into the sewage drain via the end 35 of outlet bridge 32, carrying solids with it.

Figure 6:
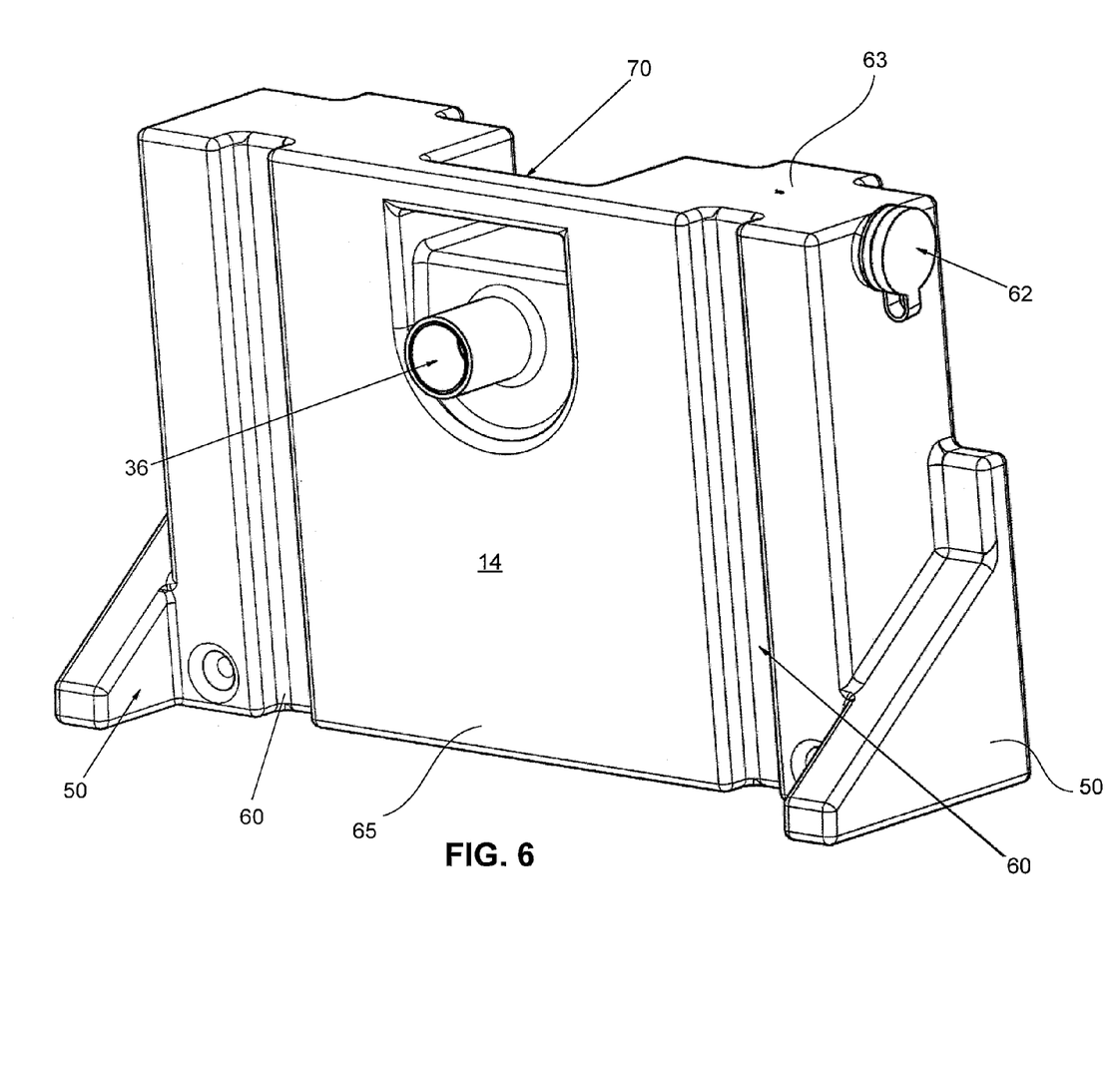
FIG. 6 is a front perspective view of an embodiment of the storage tank.
Figure 7:
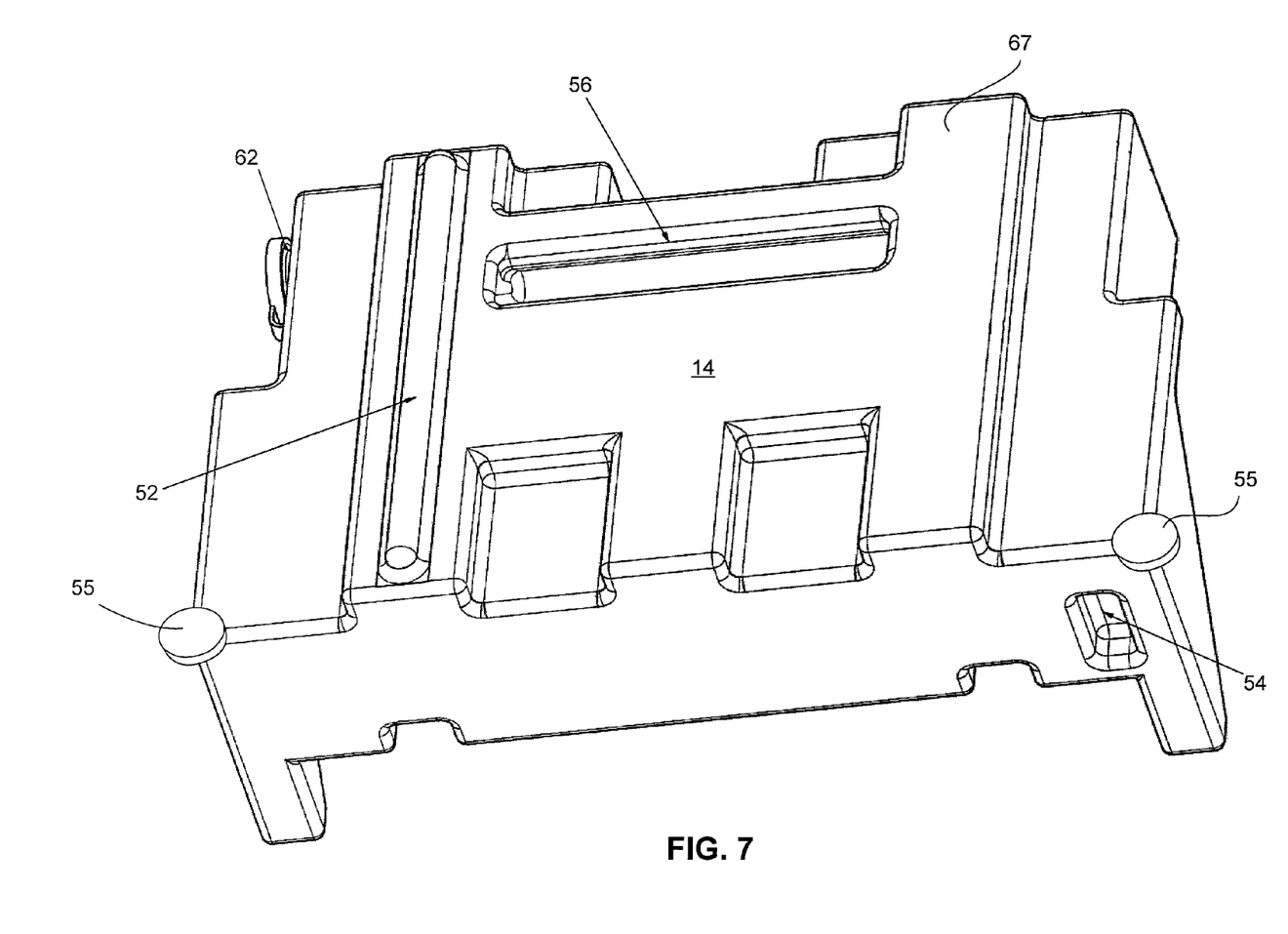
FIG. 7 is a lower perspective view of an embodiment of the storage tank.

Storage tank 14 of assembly 10 is best seen in FIGS. 6-8. Storage tank 14 is preferably constructed of roto-molded plastic; however, other materials and methods can be used such as injection molding, metal stamping or other techniques. In one embodiment, strengthening ribs 60 may be provided for adding strength and stability to the walls of the storage tank 14. This is helpful in the rotomolded embodiment. Storage tank 14 includes a hub 36 for interfacing with guide funnel 40. Typically, hub 36 may be directed and accepted by guide funnel 40 and is enclosed by seal 42. Wheels 55 on the bottom of the tank 14 aid in its transport when full.

As the liquid level in container 12 rises, F.O.G. floating on the water, and some portion of water, flows out through port 28 and into storage tank 14. The interaction between hub 36, guide funnel 40 and seal 42 prevents leakage of F.O.G. or water as they pass from the container 12 to storage tank 14 by forming a substantially water-tight barrier.

Figure 9:
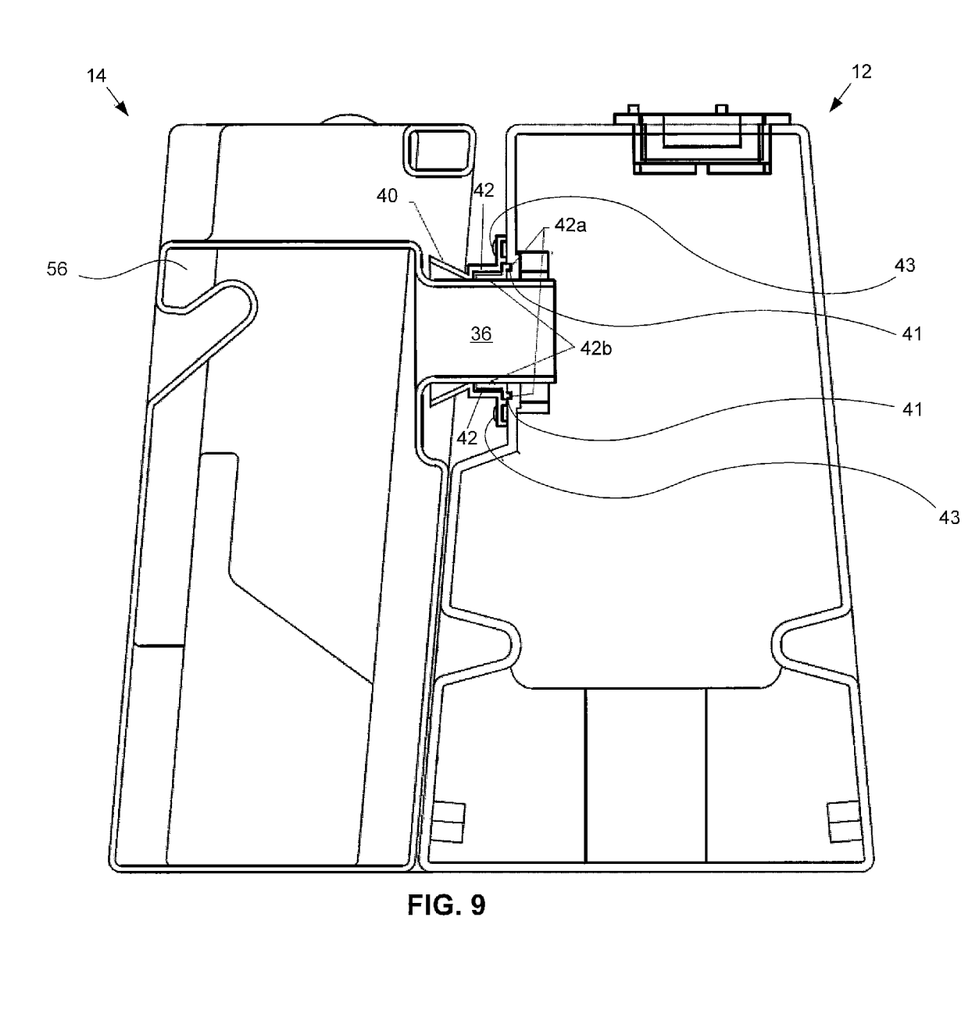
FIG. 9 is a sectional view of an embodiment of the container and storage tank together.
Figure 10:
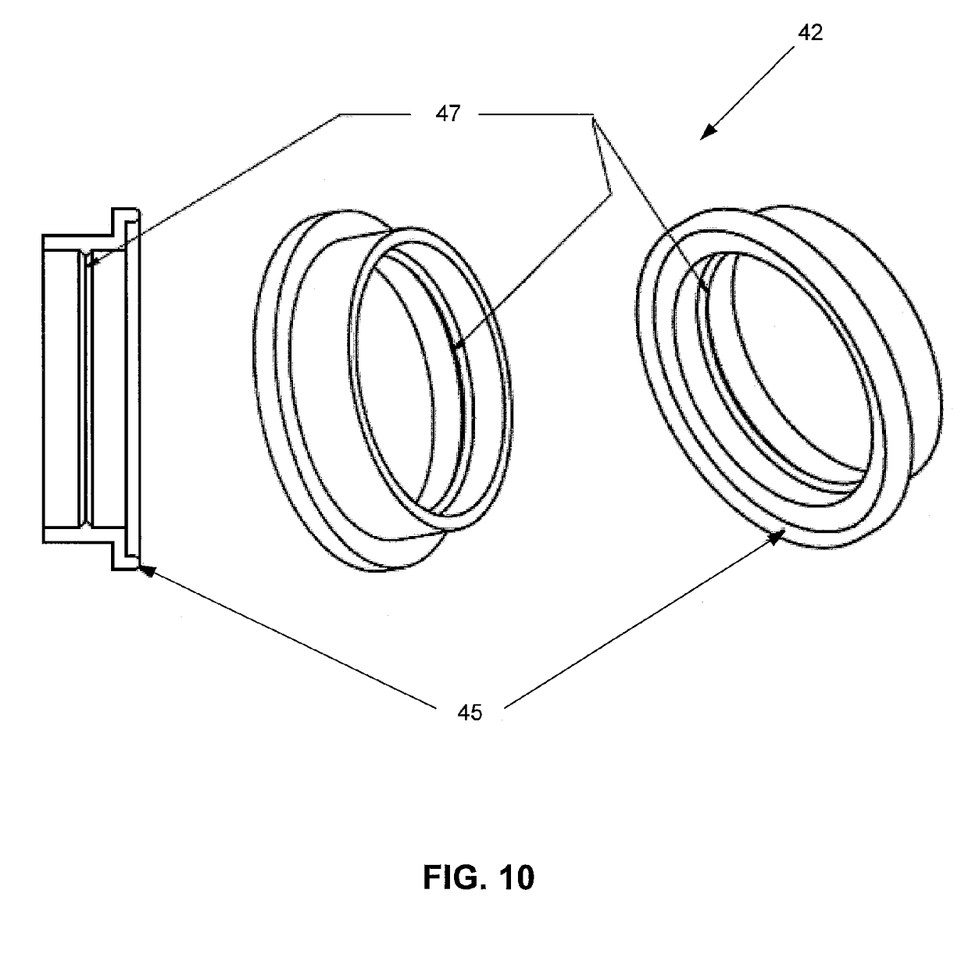
FIG. 10 is an expanded view of a portion of the assembly of FIG. 9.

As seen in FIG. 9-10, the seal 42 may include a first seal point 42a and a second seal point 42b. First seal point 42a may include a one-half o-ring type fitting 45 that fits into annular recess 41 of an outside face of container 12. Seal point 42a is secured to container 12 by the force clamping guide funnel 40 to container 12, such as by screws 43. A second seal point 42b may include a gasket 47. Gasket 47 is made of a resilient material and by way of example may be an elastic-type rubber piece. Gasket 47 protrudes inwardly, in an uncompressed state, from seal 42. Hub 36 interfaces snuggly with guide funnel 40 and port 28 so that at seal point 42b gasket 47 is compressed radially and expands axially to form a water-tight sealing barrier around the circumference of hub 36.

When storage tank 14 is to be emptied of F.O.G., the tank is removed by pulling handle 56 and releasing the hub 36 from the port 28 and guide funnel 40. This removal causes a wiping action to occur on the hub so that any accumulation of sediment around the interface of seal point 42b and hub 36 is dislodged and substantially removed. Once separated, hub 36, and seal 42 may be further wiped clean prior to reestablishing the interface. Gasket 47, being substantially resilient, returns largely to its uncompressed shape when the hub 36 is removed. The fitting 45 and gasket 47 of seal 42 are typically replaceable if wear occurs.

Returning to FIGS. 6-8, hub 36 has an attached transfer tube 58 which delivers the F.O.G. and water mixture substantially into a low part of the storage tank 14 as the water level in container 12 rises. F.O.G. and water stored in the tank 14 stratify, with the F.O.G. floating on the top of the water layer in the tank 14. Since transfer tube 58 extends substantially to and delivers entering F.O.G. and water to the bottom of storage tank 14, the already established separated F.O.G. layer in tank 14 is less disturbed by the incoming flow. When the effluent from the sink slows and the fluid level in container 12 declines below the static water level W defined by the bottom 25, the fluid flow reverses from the storage tank 14, due to hydrostatic pressure, into the container 12. However, by that time, the F.O.G. has floated to the top of the container 14, so the transfer tube 58 draws substantially only water from the lower portion of storage tank 14. The water travels up and out the transfer tube 58, through hub 36 and port 28 and back into the container 12 until the liquid level within the tank 14 reaches the static water level W of the container 12. Therefore, the amount of water in storage tank 14 diminishes while the F.O.G. is retained and stored.

It may be difficult to determine the stratification level between water and F.O.G. within storage tank 14, therefore, the storage tank could appear full of F.O.G. when actually there is a smaller amount of F.O.G. in the F.O.G./water ratio contained within the storage tank. This problem has been solved in the past with sensors which can increase the cost and complexity of such assemblies. A F.O.G. level sight glass 52 may be included in storage tank 14 that allows easy visualization of the F.O.G./water content. Sight glass 52 prevents unnecessary and premature emptying of storage tank 52 and easy viewing of the F.O.G. and water levels within the storage tank 14 by inspectors or operators.

While the prior art has supplied F.O.G. storage containers that may be emptied and reused, there remains a need for such a removable storage container that minimizes the difficulty and mess that has come to be associated with such containers. The port 28/hub 36/seal 42 interface addresses the need of minimizing the mess when fluids are transferred to and from the storage tank 14 but the design of the interface also accomplishes easy and mess free emptying of the tank 14. When emptying is required, a pull handle 56 may be used for separating the tank 14, from the container which pulls the hub out of the port 28. Since the pull handle 56 is at about the same height as the hub, as seen in FIG. 9, the sideways force caused by pulling handle 56 laterally is inline to retract the hub 36 from the port.

A separate carry handle 70 (see FIG. 6) may be used for transporting storage tank 14 to empty the accumulated F.O.G. Carry handle 70 may be placed on the top 63 of storage tank 14 and toward the same side as the hub 36. This places the carry handle 70 set apart from the center of gravity of storage tank 14 so that the weight distribution of the loaded tank 14 pivots the hub 36 upwards when tank 14 is lifted or pulled on wheels 55 by carry handle 70. With hub 36 skewed upward, F.O.G. is not inclined to spill or leak out of the storage tank 14. Wheels 55 may be oriented in any direction to allow storage tank 14 to roll at various angles.

A pour spout 62 allows ease of discarding stored F.O.G. Typically, pour spout 62 may be a rubber seal; however, other types of spouts may work as well. In one embodiment, finger grip 54 may be positioned on the bottom of the tank 14 on the opposite end from spout 62 (see FIG. 7) so that one may grip the grip 54 of the tank 14 with one hand and the carry handle 70 with the other hand and tilt the tank so that the contents empty through pour spout 62. These features provide a clean and effective way to dispose of stored F.O.G. without the mess usually associated with F.O.G. tank emptying.

Leg guides 50 may be provided for aligning the tank 14 with the container 12, by straddling the container 12. If the tank 14 is empty, pull handle 56 may be pushed to guide hub 36 to interface into the guide funnel 40 and its seal 42 and establish liquid-tight communication with port 28. Leg guides 50 may be located on either the tank 14 or the container 12 for guiding the units 12 and 14 back together; however, the guide legs 50 also serve for stabilization in route or when free standing when they are located on tank 14.

Figure 11:
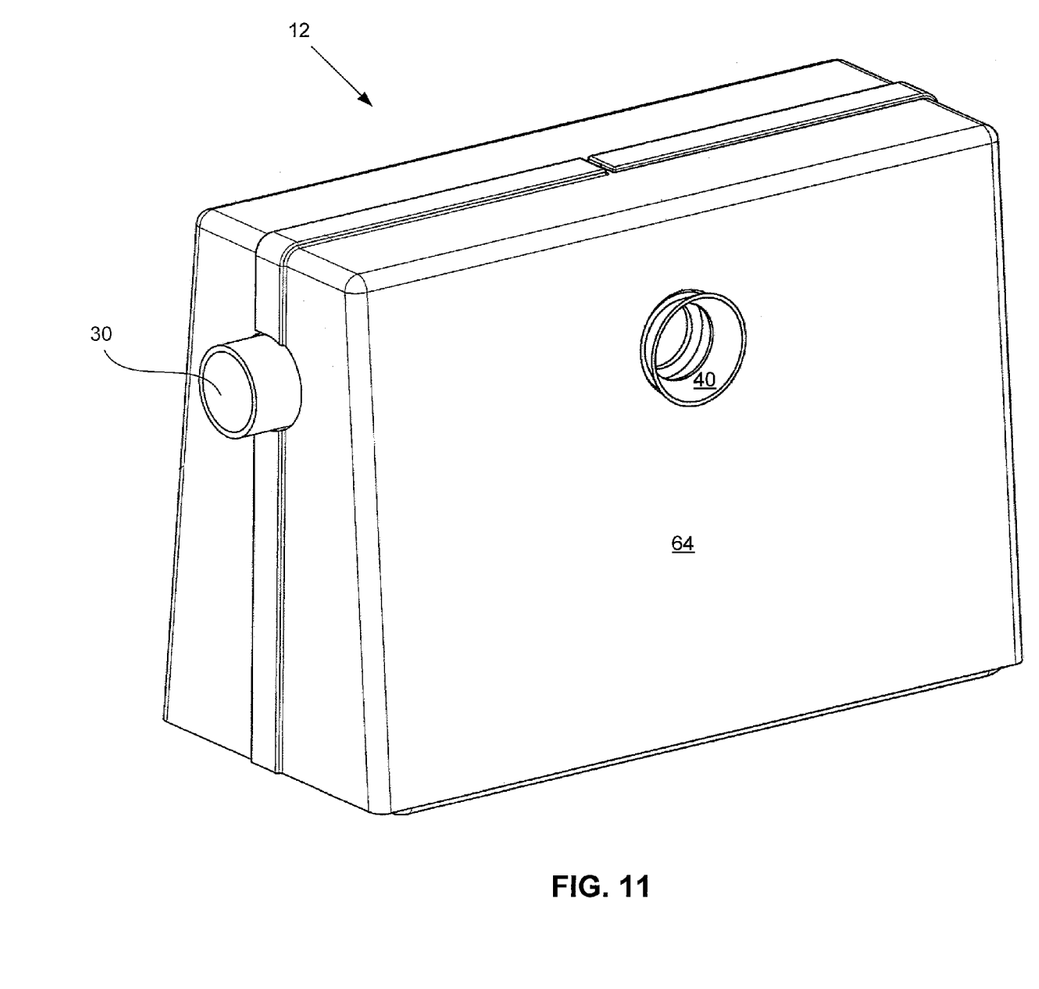
FIG. 11 is a perspective view of an embodiment of the container having a wrap.

As seen in FIG. 11, in one embodiment, the container 12 may be substantially enclosed in a separator wrap 64. The separator wrap 64 has openings through which the inlet bridge 30 and the outlet bridge 32 connect to the sink and sewer drain. There is also a fitted hole through which the guide funnel 40 passes to allow the funnel 40 to interface with hub 36. Storage tank 14 may remain outside of the separator wrap 64 so that it may be easily accessed for F.O.G. disposal.

Figure 12:
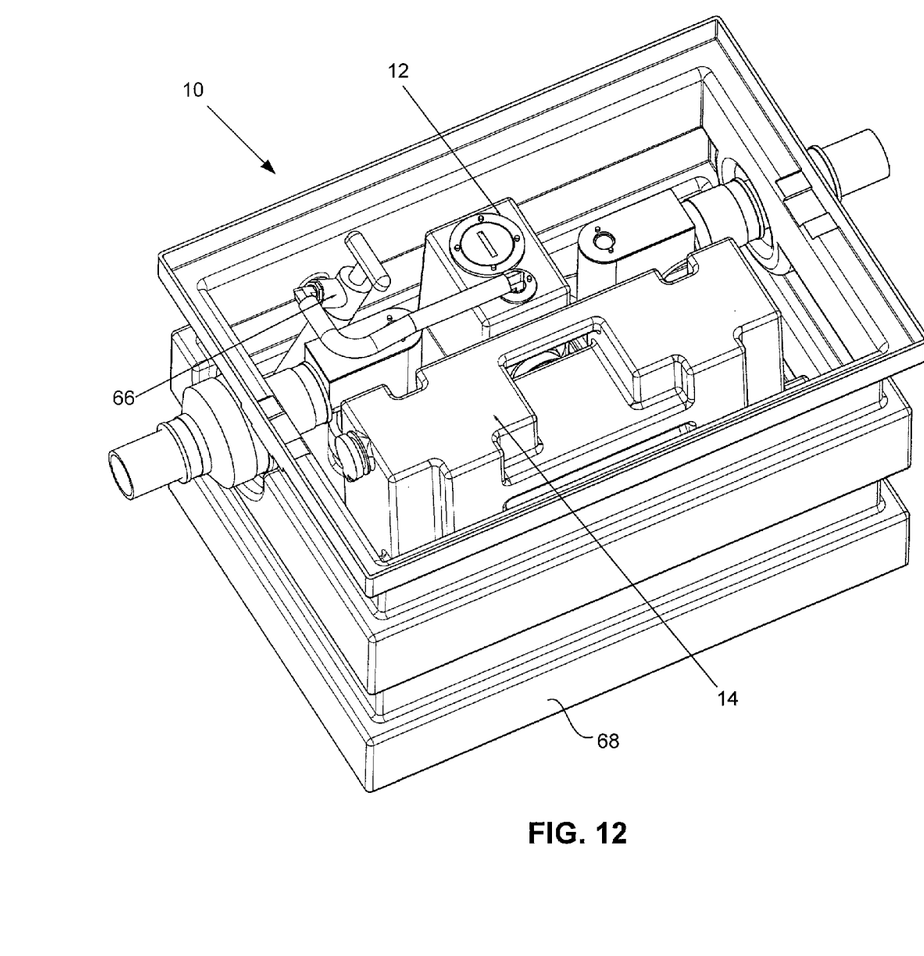
FIG. 12 is a top view of an embodiment of the invention situated within a vault.

Turning to FIG. 12, the assembly 10 may also include a vault 68 for substantially enclosing the assembly 10. The container 12 and storage tank 14 are both encased inside of vault 68. Vault 68 may be one piece or have a removable side for accessing the storage tank 14. Vault 68 may additionally be covered by a lid. A hand pump 66 may be included within vault 68 in the event of water accumulation within vault 68. Hand pump 66 may re-circulate accumulated fluids into container 12.

The invention may also be considered a method of removing F.O.G. from effluent. Steps involved include connecting a kitchen drain (not shown) to an inlet 22 or inlet bridge 30 of a container 12 and connecting a sewage drain (not shown) to an outlet 24 or an outlet bridge 32 in the container 12. The outlet bridge 32 has a bottom end 25 located such that a static water level W for liquid in the container is defined by the downstream leg of the bridge 32. The method also includes placing a removable storage tank 14 next to container 12, interfacing a hub 36 on a storage tank 14 with a port 28 on the container 12 by fitting the hub 36 into a guide funnel 40 having a seal 42. This creates a water-tight interface between the hub and the container 12. Effluent water containing F.O.G. from the kitchen drain discharges into the inlet 22. The effluent water containing F.O.G is held inside the container 12 for a period to allow F.O.G. to float to the top of the contained effluent water, and grey water flows from the container outlet 24 to the sewage drain. Intermittently, the liquid level in the container rises above the static water level and while the liquid level is raised, floating F.O.G. flows through the port 28 in the container 12 and into the storage tank 14. When the liquid level subsides, water at the bottom of the tank 14 returns to the container 12. The method may include monitoring a sight glass 52 on the storage tank 14 to determine when the F.O.G. level within the tank 14 is sufficient to warrant emptying, separating the interface between the hub 36 and the port 28 by replaceably removing the storage tank 14, emptying the F.O.G. stored in the storage tank 14 and reestablishing the interface between the hub 36 and the port 28.

Rotomolding is the preferred fabrication method for the several components because of its low cost. Other forms of fabrication may be used.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An economical fat, oil, and grease (F.O.G.) removal assembly for use in kitchens, comprising:
    a container having a bottom, a top, at least one sidewall, an inlet to receive an influent flow of F.O.G. and water from a sink drain and an outlet for discharging grey water from the container, wherein the inlet and outlet are spaced above the bottom and below the top,
    a port in the container at an elevation such that F.O.G. floating on water in the container can flow from the container out through the port when the liquid level in the container is raised above a static water level:
    a guide funnel on the container surrounding the port,
    a seal secured by the guide funnel,
    a removable storage tank having a front, a back and a top, arranged to accept F.O.G. that flows out of the container through the port when the liquid level in the container is raised above the static water level,
    a hub on the front storage tank interfacing with the seal in the port by fitting substantially into the guide funnel, whereby the hub, port, and guide funnel interface to create a water-tight connection, and
    a transfer tube extending internally into the storage tank from the hub.

2. The assembly according to claim 1, further including at least one baffle in the container extending to a level below the static water level to allow water to flow below the baffle from the inlet to the outlet but retaining F.O.G. floating on the water.

3. The assembly according to claim 1, further including an inlet bridge directing the influent from the sink drain into the inlet and an outlet bridge directing the grey water out of the container.

4. The assembly according to claim 3, wherein the inlet bridge and the outlet bridge are identical to one another in structure.

5. The assembly according to claim 3, wherein the inlet and outlet bridges include a lower portion and an upper portion and wherein the upper portion of each bridge includes an anti-siphon tube.

6. The assembly according to claim 5, wherein the upper portion forms a removable cap for the lower portion.

7. The assembly according to claim 5, wherein the lower portion includes a notch for inducing fluid counter flow.

8. The assembly according to claim 7, wherein the notch is a cut-out from a barrier that rests on the bottom of the container.

9. The assembly according to claim 3, wherein the inlet and outlet bridges are rotatable to accept or discharge effluent and grey water from various directions to accommodate a preexisting drain pipe configuration.

10. The assembly according to claim 1, wherein the storage tank is made of rotomolded plastic.

11. The assembly according to claim 1, wherein the container includes a clean out port.

12. The assembly according to claim 1, wherein the seal is replaceable.

13. The assembly according to claim 12, wherein the guide funnel has an inwardly protruding ring that forms the seal with the hub.

14. The assembly according to claim 12, wherein the storage tank includes a carry handle.

15. The assembly according to claim 1, wherein the storage tank includes leg guides for assisting with placement of the storage tank next to the container.

16. The assembly according to claim 1, wherein the storage tank includes a F.O.G. level sight glass.

17. The assembly according to claim 1, wherein the storage tank includes a finger grip.

18. The assembly according to claim 1, wherein the storage tank includes a wheel so that the tank may be rolled when the F.O.G. is to be disposed of from the tank.

19. The assembly according to claim 1, wherein the transfer tube extends substantially to a low point of the storage tank.

20. The assembly according to claim 1, wherein the storage tank includes a pour spout for removal of F.O.G.

21. The assembly according to claim 1, wherein the storage tank includes vertical strengthening ribs.

22. The assembly according to claim 1, further including a wrap substantially enclosing the container.

23. The assembly according to claim 1, further including a vault substantially encasing the assembly.

24. The assembly according to claim 23, further including a pump for removal of water from the vault.

25. The assembly according to claim 1, wherein the storage tank further includes a carrying handle on the top of the storage tank, arranged distal to the center of gravity of the storage tank toward the front of the storage tank, wherein picking the storage tank up by the carrying handle skews the weight of the stored F.O.G., tilting the hub upwardly in order to avoid spilling the enclosed F.O.G. through the hub.

26. The assembly according to claim 1, wherein the seal includes a first seal point and a second seal point.

27. The assembly according to claim 26, wherein the first seal point includes an o-ring compressible into a recess in the container.

28. The assembly according to claim 26, wherein the second seal point includes a resilient rubber gasket compressible between the seal and the port.

29. A method of removing fat, oil, and grease (F.O.G.) from effluent comprising:
   connecting a kitchen drain to an inlet of a container,
   connecting a sewage drain to an outlet in the container, the outlet being located on the container to define a static water level for liquid in the container,
   placing a removable storage tank next to the container,
   interfacing a hub on a storage tank with a port on the container by fitting the hub into a guide funnel on the container having a seal, and thereby creating a water-tight interface between the hub and the container,
   discharging effluent water containing F.O.G. from the kitchen drain into the inlet,
   holding the effluent water containing F.O.G inside the container for a period to allow F.O.G. to float to the top of the contained effluent water,
   permitting grey water to flow from the container outlet to the sewage drain,
   intermittently raising the liquid level in the container above the static water level, and while the liquid level is raised, discharging floating F.O.G. through the port in the container and into the storage tank,
   separating the interface between the hub and the port by replaceably removing the storage tank,
   emptying the F.O.G. stored in the storage tank,
   replacing the storage tank next to the container, and
   reestablishing the interface between the hub and the port.

30. The method of removing F.O.G. from effluent of claim 29, further including picking up the storage tank by a carrying handle arranged away from the center of gravity and toward the port so that the weight of the stored F.O.G., tilts the tank so the points hub upwardly to avoid spilling the enclosed F.O.G.

31. The method of removing F.O.G. from effluent of claim 29, further including monitoring a sight glass on the storage tank to determine when the F.O.G. level within the tank is sufficient to warrant emptying.

32. An economical fat, oil, and grease (F.O.G.) removal assembly for use in kitchens, comprising:
   a container having a bottom, a top, at least one sidewall, an inlet to receive an influent flow of F.O.G. and water from a sink drain and an outlet for discharging grey water from the container,
   a riser in the container, wherein F.O.G. is allowed to collect,
   a set of baffles in the container extending to a level below the static water level to allow water to flow below the baffles from the inlet to the outlet but retaining F.O.G. floating on the water,
   a port in the container at an elevation such that F.O.G. floating on water in the container can flow from the container out through the port when the liquid level in the container is raised above the static water level,
   a guide funnel on the port securing a seal, wherein the seal includes a first seal point between the container and the seal and a second seal point between the hub and the seal,
   an inlet bridge attaching to the inlet, including an upper and lower portion, for directing the influent from the sink drain into the inlet, wherein the inlet bridge is spaced above the bottom and below the top to define a static water level for liquid in the container,
   an outlet bridge attaching to the outlet, including an upper and lower portion, for directing the grey water out of the container, wherein the outlet bridge is spaced above the bottom and below the top to define a static water level for liquid in the container,
   a counter flow notch located on the inlet bridge and the outlet bridge that directs the flow of fluid within the container,
   a removable storage tank arranged to accept F.O.G. that flows out of the container through the port when the liquid level in the container is raised above the static water level, the removable storage tank comprising:
      a hub on the storage tank interfacing with the port, wherein the seal prevents leakage as fluids pass between the hub and the port,
      a transfer tube extending internally into a low portion of the storage tank,
      leg guides for assisting with placement of the storage tank next to the container,
      a grease level sight glass for viewing F.O.G. and fluids within the storage tank,
      a pour spout near the near the top of the tank for removal of F.O.G. from the tank,
      a pull handle located on the storage tank, and
      a carry handle configured away from the center of gravity of the storage tank and towards the hub, so that picking the storage tank up by the carry handle orients the tank hub upward, inhibiting spillage of F.O.G. when the tank is being carried.

* * * * *